United States Patent
Yun et al.

(10) Patent No.: US 10,032,167 B2
(45) Date of Patent: Jul. 24, 2018

(54) ABNORMAL PATTERN ANALYSIS METHOD, ABNORMAL PATTERN ANALYSIS APPARATUS PERFORMING THE SAME AND STORAGE MEDIUM STORING THE SAME

(71) Applicant: LG CNS CO., LTD., Seoul (KR)

(72) Inventors: Hae Yong Yun, Seoul (KR); Kang Hee Lee, Seoul (KR); Ki Hyun Cho, Seoul (KR); Seong Jin Yoo, Seoul (KR)

(73) Assignee: LG CNS CO., LTD., Seoul (KR)

( * ) Notice: Subject to any disclaimer, the term of this patent is extended or adjusted under 35 U.S.C. 154(b) by 168 days.

(21) Appl. No.: 14/561,759

(22) Filed: Dec. 5, 2014

(65) Prior Publication Data
US 2016/0162759 A1  Jun. 9, 2016

(51) Int. Cl.
*G06K 9/68* (2006.01)
*G06Q 20/40* (2012.01)
*G06Q 10/10* (2012.01)

(52) U.S. Cl.
CPC ......... *G06Q 20/4016* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2006/0294095 A1* | 12/2006 | Berk | G06Q 10/04 |
| 2013/0024339 A1* | 1/2013 | Choudhuri | G06Q 30/0185 |
| | | | 705/35 |
| 2015/0269577 A1* | 9/2015 | Avegliano | G06Q 20/4016 |
| | | | 705/44 |

FOREIGN PATENT DOCUMENTS

| | | |
|---|---|---|
| KR | 10-1153968 | 5/2012 |
| KR | 10-1364763 | 2/2014 |

* cited by examiner

*Primary Examiner* — Fred Hu
(74) *Attorney, Agent, or Firm* — KED & Associates, LLP

(57) ABSTRACT

An abnormal pattern analysis method includes determining a service application associated with analysis data, selecting at least one abnormal pattern analysis module in an abnormal pattern analysis framework based on the determined service application and performing an analysis for the analysis data through the selected at least one abnormal pattern analysis module to detect an abnormal pattern.

17 Claims, 8 Drawing Sheets

FIG.8
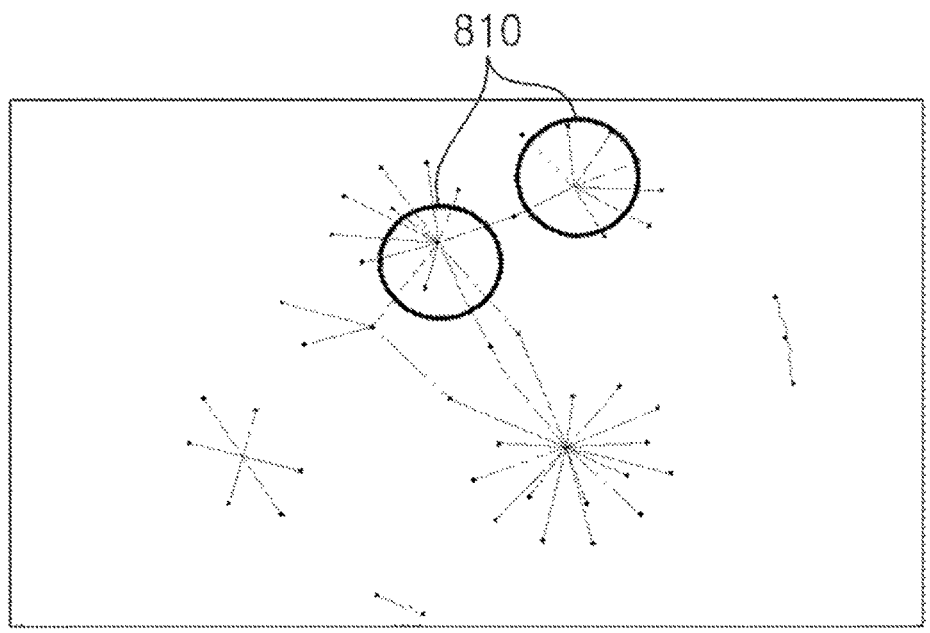
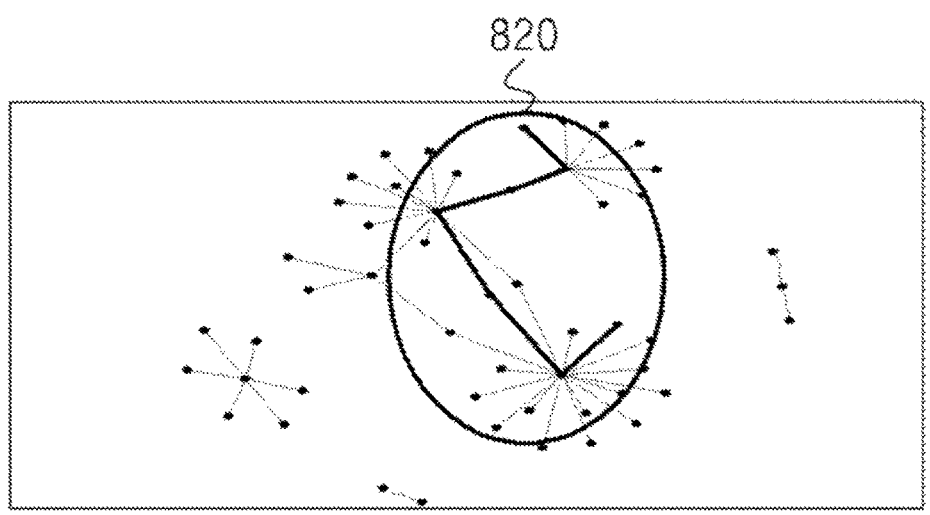

ABNORMAL PATTERN ANALYSIS METHOD, ABNORMAL PATTERN ANALYSIS APPARATUS PERFORMING THE SAME AND STORAGE MEDIUM STORING THE SAME

BACKGROUND

1. Field

Provided is an abnormal pattern analysis method, abnormal pattern analysis apparatus performing the same and a storage medium storing the same.

2. Background

Abnormal pattern analysis methods, abnormal pattern analysis apparatuses performing the same and a storage mediums storing the same are known. However, they suffer from various disadvantages.

BRIEF DESCRIPTION OF THE DRAWINGS

The embodiments will be described in detail with reference to the following drawings in which like reference numerals refer to like elements wherein:

FIG. 8 is a diagram illustrating the abnormal pattern analysis being performed through a suspicious relationship module in FIG. 2.

DETAILED DESCRIPTION

Figure 1:
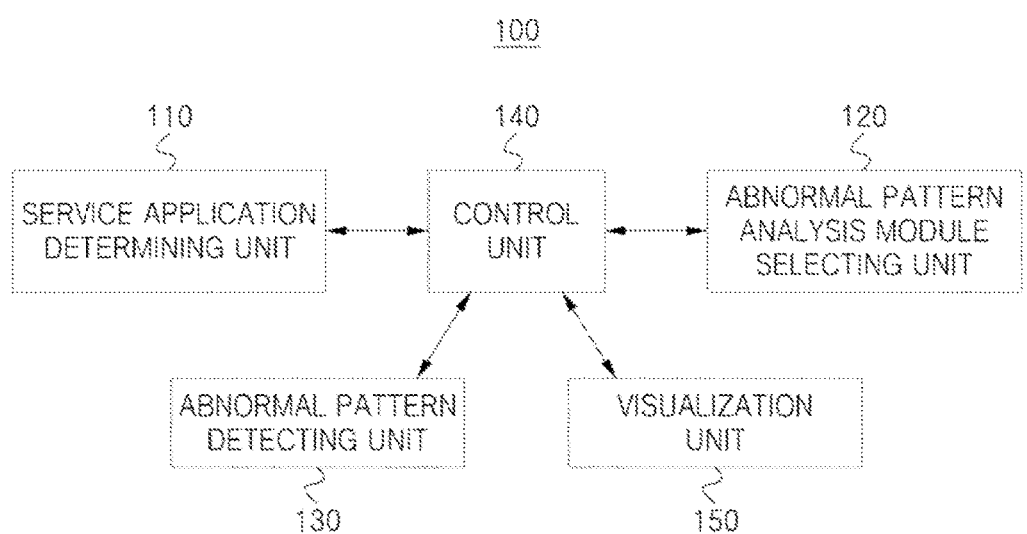
FIG. 1 is a block diagram of an abnormal pattern analysis apparatus.

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a," "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The present disclosure may be implemented as machine-readable codes on a machine-readable medium. The machine-readable medium may include any type of recording device for storing machine-readable data. Examples of the machine-readable recording medium may include a read-only memory (ROM), a random access memory (RAM), a compact disk-read only memory (CD-ROM), a magnetic tape, a floppy disk, optical data storage, or any other appropriate type of machine-readable recording medium. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

In general, a data pattern analysis may be used in various industrial field such as a finance, economy, medicine and science. Specially, an abnormal data pattern may be variously used in an abnormal security detection (e.g., a detection of a deposit claim fraud or insurance claim fraud), internal control and omitted cost analysis fields. However, the amount of information is rapidly increased with development of information communication technology, therefore, it becomes more difficult to check and monitor the data.

A financial fraud prevention system and method may include preventing a financial transaction of a user storing and managing data for financial fraud examples being collected through multiple channels by a type, and storing and managing data for usual financial transaction data of users by a user to determine whether a financial transaction of a user being performed through a communication network is a financial fraud.

A financial fraud information system and method of using a financial transaction pattern analysis may include analyzing a transaction pattern based on transactional information such as a deposit, withdrawal and inquiry of a client account in a financial institution to calculate a degree of risk of the financial transaction and performing a message process to a client according to the risk degree of the financial transaction when the client performs a credit transfer transaction on a financial transaction device to perform an additional action based on transaction pattern information of a suspicious account.

Provided herein is an improved method for abnormal pattern analysis. As broadly described and embodied herein, an abnormal pattern analysis method, abnormal pattern analysis apparatus performing the same and a storage medium storing the same detecting whether an abnormal pattern exists through an abnormal pattern analysis module being most suitable for a corresponding service application according to a service application type determined based on analysis data.

Embodiments may provide an abnormal pattern analysis method may include selecting at least one abnormal pattern analysis module in an abnormal pattern analysis framework based on a service application associated with analysis data.

Embodiments may provide an abnormal pattern analysis method capable of detecting whether an abnormal pattern exists and whether a possibility of an abnormal pattern exists through a main abnormal pattern analysis module and a sub-abnormal pattern analysis module.

Embodiments may provide an abnormal pattern analysis method capable of categorizing an abnormal pattern analysis framework to a plurality of analysis groups and including at least one analysis module in the plurality of analysis groups.

Embodiments may provide an abnormal pattern analysis method capable of visually providing an analysis result for analysis data to a user to enable the user to easily recognize an abnormal pattern detection status.

Figure 2:
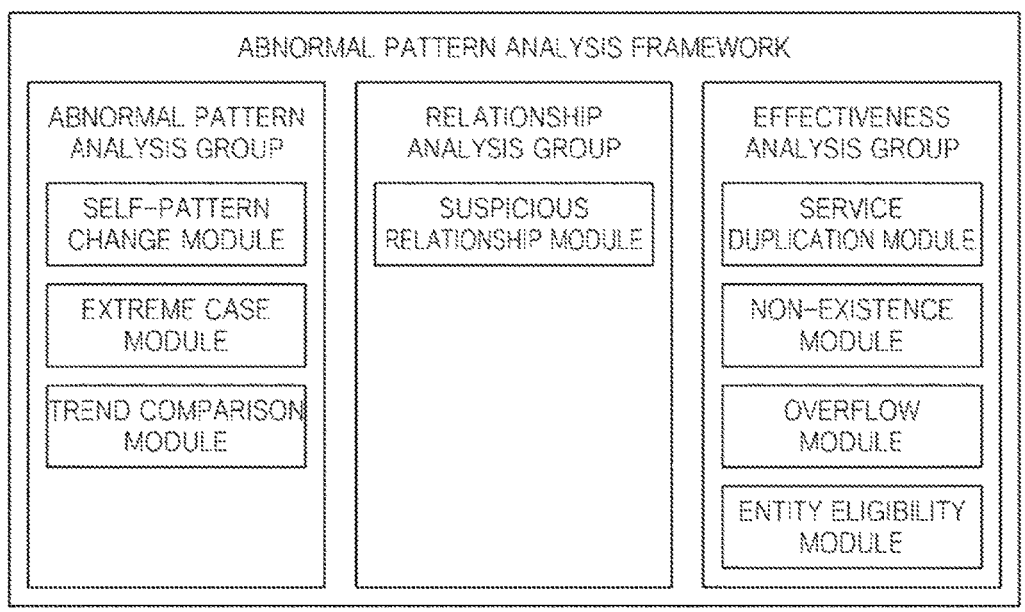
FIG. 2 is a block diagram of an abnormal pattern analysis framework.

FIG. 1 is a block diagram of an abnormal pattern analysis apparatus. FIG. 2 is a block diagram of an abnormal pattern analysis framework. The abnormal pattern analysis apparatus 100 may include a service application determining unit 110, abnormal pattern analysis module selecting unit 120, abnormal pattern detecting unit 130 and a control unit 140.

The service application determining unit 110 may determine a service application associated with analysis data. Herein, the analysis data may correspond to analysis target data for which an abnormal pattern is detected. The analysis data may be controlled through a database. Also, the service application may correspond to a specific application field or type for detecting the abnormal pattern. For example, the service application may be tailored for detecting financial fraud for a charged amount being required from a customer or for detecting conspiracy and collusion for a specific document.

In an embodiment, the service application determining unit 110 may determine an abnormal pattern detection scenario based on an analysis data field being required in the service application. Herein, the analysis data field may form the analysis data and correspond to a criterion classifying the analysis data. For example, when the analysis data corresponds to a financial transaction for a customer, {customer name, charged item, charged amount and charged date} may correspond to the analysis data field. Also, the abnormal pattern detection scenario may be used for the service application to actually detect any abnormal pattern and may correspond to whether any abnormal pattern is detected in a specific field. For example, when the service application is {financial fraud for charged amount being required from customer}, the abnormal pattern detection scenario corresponding to {detecting whether information being falsely charged from corresponding customer exists based on charged item and charged amount} may be determined based on an analysis data field for {customer name, charged item, charged amount and charged date}.

The abnormal pattern analysis module selecting unit 120 may select at least one abnormal pattern analysis module in the abnormal pattern analysis framework based on the service application determined through the service application determining unit 110. In an embodiment, the at least one abnormal pattern analysis module may be associated with the service application or the abnormal pattern detection scenario. Herein, when it is suitable to consider a characteristic of the service application or the abnormal pattern detection scenario to perform an analysis through a corresponding abnormal pattern analysis module, the at least one abnormal pattern analysis module may be associated with a corresponding service application or a corresponding abnormal pattern detection scenario. For example, a self-pattern change module and a service duplication module, as illustrated in FIG. 2, may be associated with a service application corresponding to a financial fraud.

In an embodiment, when the service application or the abnormal pattern detection scenario is determined through the service application determining unit 110, at least one abnormal pattern analysis module may be automatically selected as an abnormal pattern analysis module being associated with a corresponding service application or a corresponding abnormal pattern detection scenario. Alternatively, the abnormal pattern analysis module selecting unit 120 may recommend an abnormal pattern analysis module that is associated with the corresponding service application or the corresponding abnormal pattern detection scenario.

In an embodiment, the abnormal pattern analysis module selecting unit 120 may select a main abnormal pattern analysis module and a sub-abnormal pattern analysis module associated with the service application. Herein, the main abnormal pattern analysis module may correspond to an analysis module where it is most suitable to perform an analysis for corresponding analysis data, based on a characteristic of the analysis data to perform an analysis as a main module. The sub-abnormal pattern analysis module may correspond to an analysis module assisting the main abnormal pattern analysis module to detect whether an existence possibility or probability of an abnormality in the analysis data exists.

In an embodiment, the main abnormal pattern analysis module and the sub-abnormal pattern analysis module may be associated with the corresponding service application or the corresponding abnormal pattern detection scenario according to a characteristic of the service application or the abnormal pattern. The abnormal pattern analysis module selecting unit 120 may automatically select the main abnormal pattern analysis module and sub-abnormal pattern analysis module according to a determination of the service application or the abnormal pattern detection scenario. Alternatively, the abnormal pattern analysis module selecting unit 120 may recommend the main abnormal pattern analysis module and/or sub-abnormal pattern analysis module associated with a service application or an abnormal pattern detection scenario to be determined by the user.

In an embodiment, the abnormal pattern analysis module selecting unit 120 may receive a user's selection of the at least one abnormal pattern analysis module and may receive a user's selection of the main abnormal pattern analysis module or the sub-abnormal pattern analysis module. In an embodiment, the sub-abnormal pattern analysis module may be associated with the main abnormal pattern analysis module. Also, when the user selects only the main abnormal pattern analysis module, a sub-abnormal pattern analysis module associated with the selected main abnormal pattern analysis module may be automatically selected.

In an embodiment, the abnormal pattern analysis module selecting unit 120 may categorize the at least one abnormal pattern analysis module being included in the abnormal pattern analysis framework into a plurality of analysis groups. For example, as illustrated in FIG. 2, the at least one abnormal pattern analysis module may be categorized into an abnormal pattern analysis group, a relationship analysis group and an effectiveness analysis group. Here, the abnormal pattern analysis group may include modules for disparateness analysis between the analysis data. The relationship analysis group may be a group of modules for relationship analysis between the analysis data. Moreover, the effectiveness analysis group may include module for effectiveness analysis between the analysis data.

In an embodiment, the abnormal pattern analysis module selecting unit 120 may include each of a plurality of abnormal pattern analysis modules in one of the plurality of the analysis groups as illustrated in FIG. 2. A self-pattern change module, an extreme case module and a trend comparison module may be included in the abnormal pattern analysis group. A suspicious relationship module may be included in the relationship analysis group. A service duplication module, a non-existence module, an overflow module and an entity eligibility module may be included in the effectiveness analysis group. Herein, the abnormal pattern analysis framework and each of a plurality of analysis modules included in the abnormal pattern analysis framework will be described in more detail referring to FIG. 2 and FIGS. 5 through 9.

The abnormal pattern detecting unit 130 may perform an analysis for the analysis data through the at least one the abnormal pattern analysis module selected by the abnormal pattern analysis module selecting unit 120 to detect an abnormal pattern. In an embodiment, the main abnormal pattern analysis module and the sub-abnormal pattern analysis module may be selected through the abnormal pattern analysis module selecting unit 120. The main abnormal pattern analysis module may perform the analysis for the analysis data. At this time, the sub-abnormal pattern analysis module may perform the analysis for the analysis data only where the abnormal pattern is not detected in an analysis through the main abnormal pattern analysis module.

In an embodiment, when the abnormal pattern is detected in an analysis result through the main abnormal pattern analysis module, the abnormal pattern detecting unit 130 may decide that an abnormality exists in the analysis data. Herein, the main abnormal pattern analysis module may correspond to an analysis module where it is most suitable to perform the analysis for the analysis data according to the service application. The abnormality may exist in the analysis data where the abnormal pattern is detected in the analysis result through the main abnormal pattern analysis module. Therefore, although the sub-abnormal pattern analysis module is selected, in certain situations the sub-abnormal pattern analysis module may not perform the analysis for the analysis data.

In an embodiment, when the abnormal pattern is detected only in an analysis result through the sub-abnormal pattern analysis module, the abnormal pattern detecting unit 130 may decide that an existence possibility or probability of the abnormality in the analysis data exists. Here, the sub-abnormal pattern analysis module may correspond to an analysis module where it is not most suitable to analyze the analysis data, but it assist the user to decide whether the abnormal data exists in the analysis data. In an embodiment, when the abnormal pattern is detected in an analysis result for at least part of a plurality of sub-abnormal pattern analysis modules, the abnormal pattern detecting unit 130 may numerically calculate the existence possibility or probability of the abnormality in the analysis data. For example, when the abnormal pattern is detected in only one sub-abnormal pattern analysis module of the plurality of the sub-abnormal pattern analysis modules, the existence possibility of the abnormality may be calculated as 25% (=(¼)* 100).

In an embodiment, the abnormal pattern analysis apparatus 100 may further include a visualization unit 150. Herein, the visualization unit 150 may allow a user to visualize a detection result for the abnormal pattern based on a characteristic of the abnormal pattern analysis module. For example, the abnormal pattern analysis apparatus 100 may represent the detection result for the abnormal pattern with a graph, a table or a figure. In an embodiment, the visualization unit 150 may limit or select a visualizing method to a specific method and the abnormal pattern analysis result may be visualized by a most suitable method according to a user's setting or the detection result for the abnormal pattern.

The control unit 140 may control an operation and data flow of the service application determining unit 110, the abnormal pattern analysis module selecting unit 120 and the abnormal pattern detecting unit 130.

Referring again to FIG. 2, the abnormal pattern analysis framework may include the abnormal pattern analysis group, the relationship analysis group and the effectiveness analysis group. The abnormal pattern analysis group may include the self-pattern change module, the extreme case module and trend comparison module. The relationship analysis group may include the suspicious relationship module. The effectiveness analysis group may include the service duplication module, the non-existence module, the overflow module and the entity eligibility module.

In an embodiment, the abnormal pattern analysis group may include at least one analysis module where it is suitable to detect an abnormal pattern having a large difference with a mean value compared with a same scale, a pattern change of a specific entity itself, a difference between the pattern change of the specific entity and that of other entities and the abnormal pattern where the data value is extremely biased.

In an embodiment, the relationship analysis group may include at least one analysis module where it is suitable to check an important path and to detect a conspiracy or a close relationship.

In an embodiment, the effectiveness analysis group may include at least one analysis module where it is suitable to perform a verification for an excessive duplication, a non-existence of an actual receiver and a period.

In an embodiment, the self-pattern change module may analyze the analysis data based on a time series based disparateness. In more detail, the self-pattern change module may detect an abnormal pattern of a time series based numeric data, may group a candidate group having a similar homogeneity and may search for at least one rule of a plurality of rules as described below.

In an embodiment, in a candidate group having similar homogeneity groups based on a same characteristic or feature, for example, a grouping for the numeric data may use a clustering analysis technique. Herein, the clustering analysis technique may correspond to one of multivariate statistics analysis techniques and may be used for grouping data to a homogenous group based on a similarity of various characteristics of a variable or classifying a plurality of homogenous groups to search for a common characteristic being included in a same group. For example, at least one of K-means, a numerical rate (e.g., 10% or 20%), a Euclid distance, a Mahalanobis distance, or the like may be used as the clustering analysis technique.

In an embodiment, the self-pattern change module may group the candidate group with the homogeneity in the analysis data and perform the plurality of the rules to detect whether a corresponding rule exists in the plurality of the rules. In more detail, the self-pattern change module may detect a pattern deviating from a specific criterion based on the specific criterion or a pattern representing a change of a specific type, for example, the change of the specific type may correspond to a bias, trend or vibration pattern.

Figure 5:
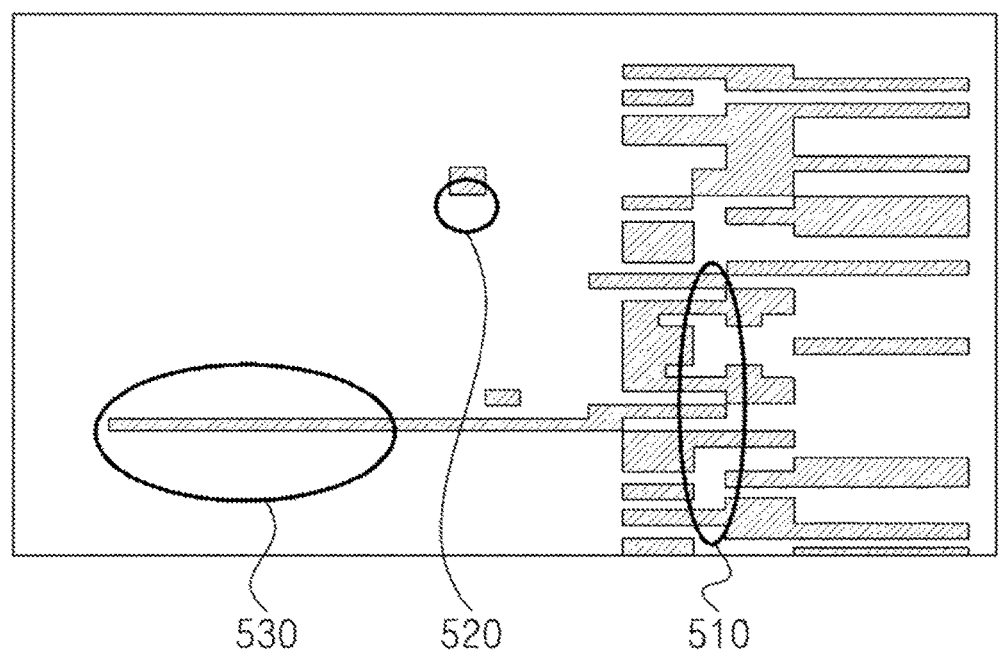
FIG. 5 is a diagram illustrating an abnormal pattern analysis being performed through a self-pattern change module in FIG. 2.

FIG. 5 is a diagram visually representing the analysis result through the self-pattern change module according to an embodiment. Values 510 represent a similar pattern and values 520 and 530 correspond to abnormal patterns. Here, the values 520 and 530 may be visualized based on values that have the abnormal pattern using the plurality of the rules.

Figure 6:
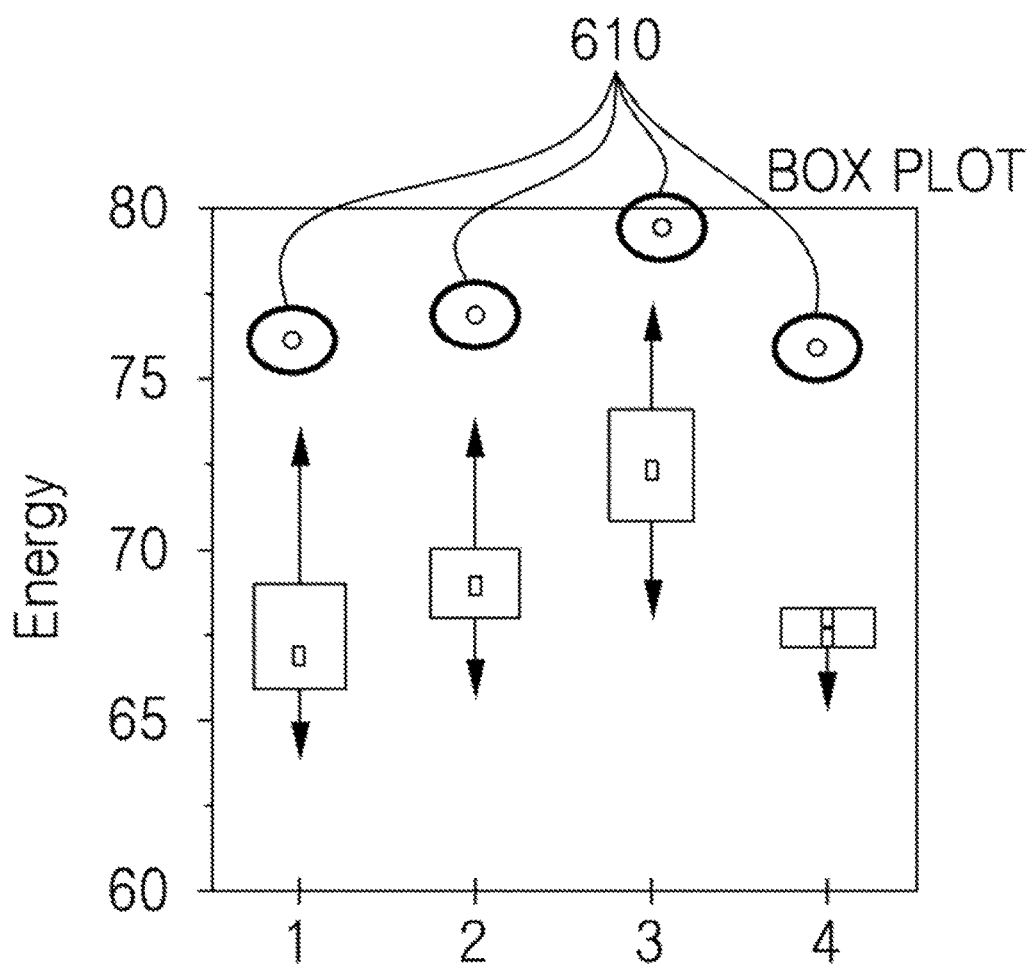
FIG. 6 is a diagram illustrating the abnormal pattern analysis being performed through an extreme case module in FIG. 2.

In an embodiment, the extreme case module may analyze the analysis data based on a deviation based disparateness away from a mean value. In more detail, the extreme case module may detect an abnormal pattern corresponding to an extreme for numeric data compared to all or a part of data and may be performed with a method of grouping a candidate having a homogeneity to searching for a group having a high abnormality. Here, a decision may be made that abnormality is larger than a mean value based on a value above or below a specific sigma set by the user in the mean value. For example, FIG. 6 is a graph representing an amount distribution by a group or an account as an analysis result through the extreme case module. The specific amounts 610 having amount distribution that is more than two sigma may correspond to the abnormal pattern. In an embodiment, information for the specific amounts 610 corresponding to the abnormal pattern may be provided from the amount distribution by the group or the account.

In an embodiment, the trend comparison module of FIG. 2 may analyze the analysis data based on a trend based disparateness. In more detail, the trend comparison module may search for whether an abnormality of a specific entity compared to full or partial distribution exists. The trend comparison module may group a candidate having a homogeneity, select a value having a large variation through a variation coefficient and search for a target where a distribution or a trend by each of targets is different than a total mean data for same group data to detect the abnormal pattern. Herein, the trend having the different target may correspond to a trend where the trend is decreased when a mean including a total group is increased.

Figure 7:
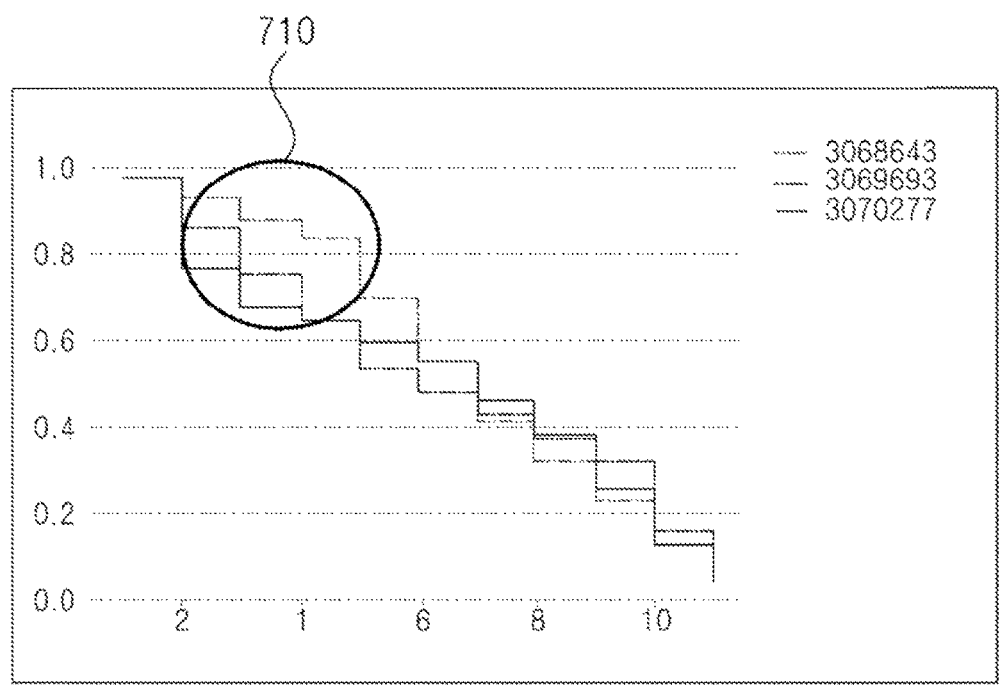
FIG. 7 is a diagram illustrating the abnormal pattern analysis being performed through a trend comparativeness module in FIG. 2.

For example, when the trend comparison module detects whether a false claim exists based on a pattern analysis for a product life cycle according to a product status being received at an agency, the data may correspond to a case where the false claim exists when a status pattern being generated according to the product life cycle is different than a general trend. Referring to FIG. 7, a portion of data 710 representing a trend that is different than a total trend may correspond to the abnormal pattern. That is, the total trend may decrease step-wise based on a fixed cycle, while a specific portion 710 may decrease but with a decrease width that is different than that of the total trend such that a pattern of the specific portion 710 is different with the total trend.

In an embodiment, the suspicious relationship module of FIG. 2 may analyze the analysis data based on a relation network analysis based on relationship. In more detail, when a target corresponding to a key is generated at various part, the suspicious relationship module may perform a method of searching for a key path and a target. For example, the suspicious relationship module may search the key path and target by using a network analysis. Herein, the network analysis may correspond to a method of technically analyzing a specific relationship structure connecting a person, a group or an object through a premise based on known behavior or attitude of a specific entity for a network structure. For example, the suspicious relationship module may perform an analysis for a possibility of a conspiracy and collusion to check a moving path of a specific confidential document. Referring to FIG. 8, a movement of an important document may be illustrated in graphical form by moving status 820. The moving status 820 for an important document may be checked based on information for a main person 810.

In an embodiment, the service duplication module of FIG. 2 may analyze the analysis data based on a duplication occurrence based effectiveness among specific groups or may detect a case where a similar text exists. Here, the service duplication module may detect an abnormal pattern in cases where a specific target repeatedly provides a specific group in a same time period.

For example, because a similar serial number is detected with reference to a serial number of a specific product, the service duplication module may be used in cases where a specific claim for the similar serial number is received to decide whether the specific claim corresponds to a false claim.

In an embodiment, the non-existence module of FIG. 2 may analyze the analysis data based on an effectiveness for non-actual data or inaccurate data. In more detail, the non-existence module corresponds to a method of detecting data corresponded in cases where specific data exists in the analysis data but has not actually occurred, measuring a similarity in cases where a frequency of a duplication occurrence is high, a mean of a time through a random generation of data is not fixed or a similar degree of a random target corresponding to a key, searching for a target having a high similarity to detect the abnormal pattern. Herein, a method of searching for the target having the high similarity may apply a separate weight according to a situation to define the abnormal pattern.

In an embodiment, the overflow module FIG. 2 may analyze the analysis data based on an effectiveness for inapplicable service data. In more detail, the overflow module may detect an abnormal pattern in cases where an inapplicable service provision by a distance, a time or a product characteristic is requested. The overflow module may group a candidate having the homogeneity and set a relationship between a time and a distance to search for a case where it is more than a criterion. For example, data corresponding to 10 minutes for a time to travel from the city of Seoul to Busan, which normally takes much longer, may be detected as the abnormal pattern through the overflow module.

In an embodiment, the entity eligibility module of FIG. 2 may analyze the analysis data based on an effectiveness for an eligibility condition of a service provider or receiver. For example, data in cases where the service provider for a specific product repair may correspond to a marketing team staff may be detected as the abnormal pattern through entity eligibility module.

Figure 3:
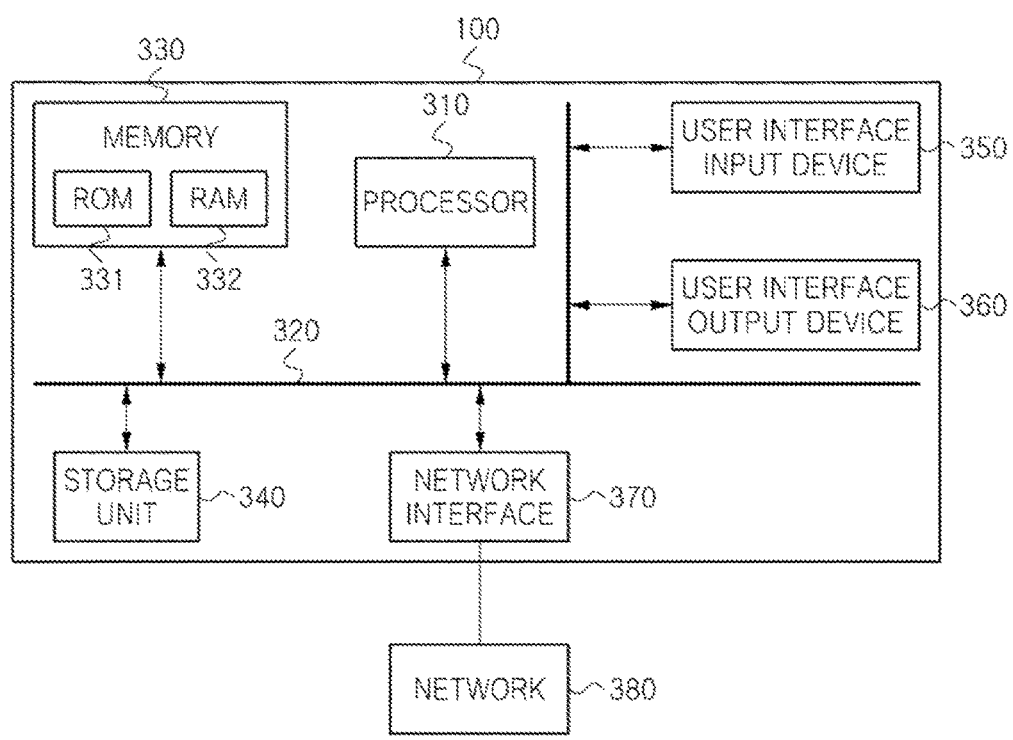
FIG. 3 is a block diagram of a hardware configuration of the abnormal pattern analysis apparatus.

FIG. 3 is a block diagram of a hardware configuration of the abnormal pattern analysis apparatus. The abnormal pattern analysis apparatus 100 may include a processor or CPU 310 communicating with various other components through a bus 320. The processor 310 may control an operation of the other components and analyze the abnormal pattern with the other components. Also, the processor 310 may be electrically connected with a memory 330 and may analyze the abnormal pattern through commends stored in the memory 330 according to a user's request.

The abnormal pattern analysis apparatus 100 may include the memory 330 and a storage unit 340 and the memory 330 may include ROM (Read Only Memory) 331 and RAM (Random Access Memory) 332. Here, the memory 330 may correspond to a transitory or persistent computer-readable medium and the storage unit 340 corresponds to a persistent computer-readable medium. At least one of the memory 330 and the storage unit 340 may store a computer code including a command for the abnormal pattern analysis.

The abnormal pattern analysis apparatus 100 may include a network interface 370 for communicating with a network 380. The network interface 370 may set an environment transferring information, data and signal between the abnormal pattern analysis apparatus 100 and the network 380.

The user may communicate with the abnormal pattern analysis apparatus 100 through a user interface input device 350 (e.g., a mouse, trackball, touch pad, graphic tablet, scanner, barcode scanner for scanning a product barcode, touch screen, keyboard, pointing device, or the like). The user interface input device 350 may include various devices for inputting information (e.g., a transaction) in the abnormal pattern analysis apparatus 100 or the network 380.

The user may receive information (e.g., an abnormal pattern analysis result) from the abnormal pattern analysis apparatus 100 through a user interface output device 360. The user interface output device 360 may include a visual output device such as a display screen, but is not limited thereto. The user interface output device 360 may include various types of devices for outputting information to user and may be combined with an output device such as a video display unit or a speaker. In an embodiment, the display screen may display information received from the abnormal pattern analysis apparatus 100 and may receive an input from the user. That is, the display screen may be implemented as the user interface input device 350 and the user interface output device 360.

Components of the abnormal pattern analysis apparatus 100 in FIG. 1 may be performed by using components of the abnormal pattern analysis apparatus 100 in FIG. 3.

Figure 4:
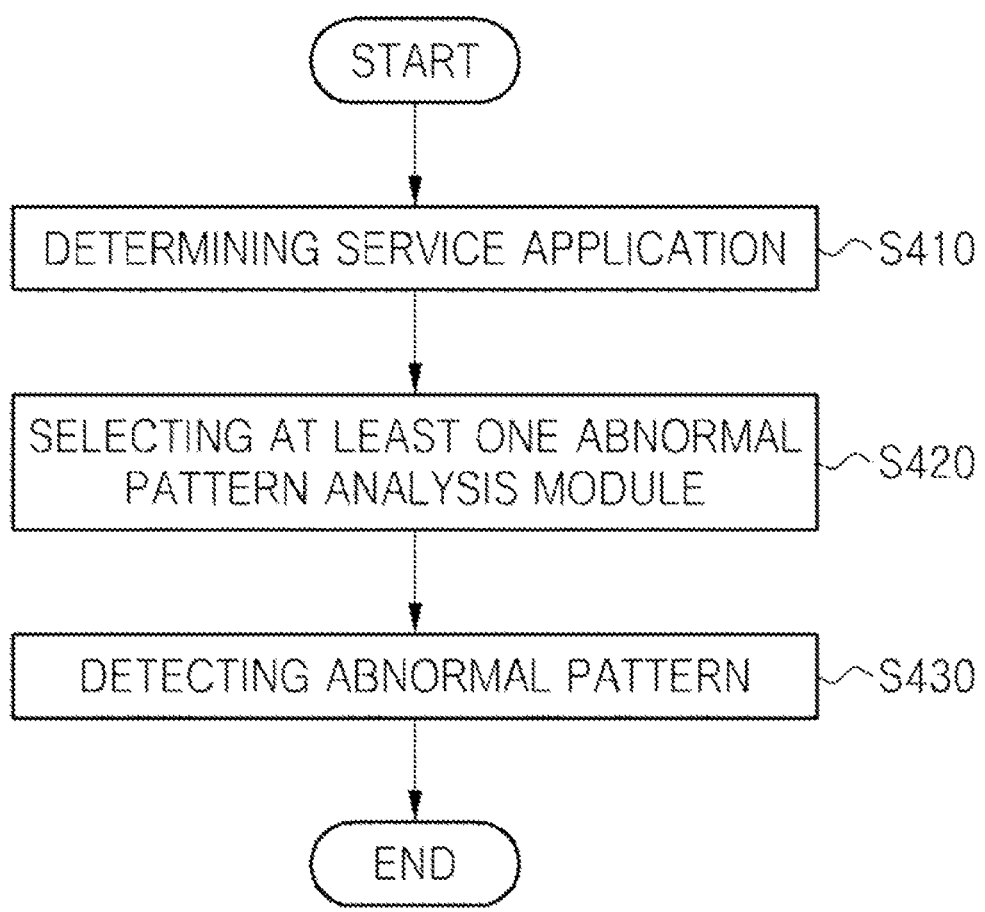
FIG. 4 is a flow chart showing an abnormal pattern analysis method being performed on the abnormal pattern analysis apparatus.

FIG. 4 is a flow chart of an abnormal pattern analysis method being performed on the abnormal pattern analysis apparatus. The service application determining unit 110 may determine the service application, in step S410. The service application may be predetermined by the user or may be additionally inputted. In an embodiment, the service application may be determined based on a characteristic of the analysis data.

The service pattern analysis module selecting unit 120 may select the at least one abnormal pattern analysis module in the abnormal pattern analysis framework based on the service application determined through the service application determining unit 110, in step S420. In an embodiment, the abnormal pattern analysis framework may be set by the user and the at least one abnormal pattern analysis module and the main abnormal pattern analysis module or the sub-abnormal pattern analysis module may be selected based on the service application or the abnormal pattern detection scenario.

In an embodiment, when the at least one abnormal pattern detection scenario or the main abnormal pattern analysis module and the sub-abnormal pattern analysis module is associated based on a characteristic of the service application or the abnormal pattern detection scenario, and the service application or the abnormal pattern detection scenario is determined through the service application determining unit 110, the at least one abnormal pattern analysis module associated with a corresponding service application or a corresponding abnormal pattern detection scenario may be automatically selected.

The abnormal pattern detecting unit 130 may perform an analysis for the analysis data through the at least one abnormal pattern analysis module selected through the service pattern analysis module selecting unit 120 to detect the abnormal pattern. In an embodiment, the abnormal pattern detecting unit 130 may decide the existence possibility of the abnormal pattern, and the existence possibility may be numerically calculated. In an embodiment, the visualization unit 150 may enable visualization by the user of the abnormal pattern detected through the abnormal pattern detecting unit 130 and detail information for the abnormal pattern. For example, the visualization unit 150 may graphically display the abnormal pattern on a display.

As broadly described and embodied herein, an abnormal pattern analysis method may include selecting at least one abnormal pattern analysis module in an abnormal pattern analysis framework based on a service application associated with analysis data.

Embodiments may include an abnormal pattern analysis method capable of detecting whether an abnormal pattern exists and whether an existence possibility of an abnormal pattern exists through a main abnormal pattern analysis module and a sub-abnormal pattern analysis module.

Embodiments may include an abnormal pattern analysis method capable of categorizing an abnormal pattern analysis framework to a plurality of analysis groups and including at least one analysis module in the plurality of analysis groups.

Embodiments may include an abnormal pattern analysis method capable of visually providing an analysis result for analysis data to a user to enable the user to easily recognize an abnormal pattern detection status.

In at least one embodiment, an abnormal pattern analysis method may include determining a service application associated with analysis data, selecting at least one abnormal pattern analysis module in an abnormal pattern analysis framework based on the determined service application, and performing an analysis for the analysis data through the selected at least one abnormal pattern analysis module to detect an abnormal pattern.

In at least one embodiment, determining the service application may include determining an abnormal pattern detection scenario based on an analysis data field being required in the service application.

In at least one embodiment, selecting the at least one abnormal pattern analysis module may include receiving a user's selection of the at least one abnormal pattern analysis module.

In at least one embodiment, selecting the at least one abnormal pattern analysis module may include selecting a main abnormal pattern analysis module and sub-abnormal pattern analysis module associated with the determined service application.

In at least one embodiment, performing the analysis for the analysis data may further include deciding that an abnormality exists in the analysis data when the abnormal pattern is detected in an analysis result through the main abnormal pattern analysis module.

In at least one embodiment, performing the analysis for the analysis data may further include deciding an existence possibility of the abnormality in the analysis data when the abnormal pattern is detected only in an analysis result through the sub-abnormal pattern analysis module.

In at least one embodiment, selecting the at least one abnormal pattern analysis module may include categorizing the at least one abnormal pattern analysis module into an abnormal pattern analysis group, a relationship analysis group and an effectiveness analysis group and wherein the abnormal pattern analysis group groups a disparateness analysis between the analysis data, the relationship analysis group groups a relationship analysis between the analysis data and the effectiveness analysis group groups an effectiveness analysis between the analysis data.

In at least one embodiment, selecting the at least one abnormal pattern analysis module may include including a self-pattern change module in the abnormal pattern analysis group, the self-pattern change module analyzing the analysis data based on a time series based disparateness.

In at least one embodiment, selecting the at least one abnormal pattern analysis module may include including an extreme case module in the abnormal pattern analysis group, the extreme case module analyzing the analysis data based on a deviation based disparateness away from a mean value.

In at least one embodiment, selecting the at least one abnormal pattern analysis module may include including a trend comparison module in the abnormal pattern analysis group, the trend comparison module analyzing the analysis data based on a trend based disparateness.

In at least one embodiment, selecting the at least one abnormal pattern analysis module may include including a suspicious relationship module in the relationship analysis group, the suspicious relationship module analyzing the analysis data based on a relation network analysis based relationship.

In at least one embodiment, selecting the at least one abnormal pattern analysis module may include including a service duplication module in the effectiveness analysis group, the service duplication module analyzing the analysis data based on a duplication occurrence based effectiveness among specific groups.

In at least one embodiment, selecting the at least one abnormal pattern analysis module may include including a non-existence module in the effectiveness analysis group, the non-existence module analyzing the analysis data based on an effectiveness for non-actual data.

In at least one embodiment, selecting the at least one abnormal pattern analysis module may include including an overflow module in the effectiveness analysis group, the overflow module analyzing the analysis data based on an effectiveness for inapplicable service data.

In at least one embodiment, the method may include visualizing a detection result for the abnormal pattern based on a characteristic of the abnormal pattern analysis module.

In at least one embodiment, an abnormal pattern analysis apparatus includes a processor, a memory including at least one storage space and a non-transitory computer-readable medium including commands causing the processor to perform a following method when the abnormal pattern analysis is executed and the method includes determining a service application associated with analysis data, selecting at least one abnormal pattern analysis module in an abnormal pattern analysis framework based on the determined service application and performing an analysis for the analysis data through the selected at least one abnormal pattern analysis module to detect an abnormal pattern.

In at least one embodiment, determining the service application may determine an abnormal pattern detection scenario based on an analysis data field being required in the service application.

In at least one embodiment, selecting the at least one abnormal pattern analysis module may select a main abnormal pattern analysis module and a sub-abnormal pattern analysis module associated with the determined service application.

In at least one embodiment, a storage medium recording a computer program for an abnormal pattern analysis method and the method includes a function to determine a service application associated with analysis data, a function to select at least one abnormal pattern analysis module in an abnormal pattern analysis framework based on the determined service application and a function to perform an analysis for the analysis data through the selected at least one abnormal pattern analysis module to detect an abnormal pattern.

An abnormal pattern analysis method according to embodiments may select at least one abnormal pattern analysis module in an abnormal pattern analysis framework based on a service application associated with analysis data.

An abnormal pattern analysis method according to embodiments may detect whether an abnormal pattern exists and an existence possibility of an abnormal pattern exists through a main abnormal pattern analysis module and a sub-abnormal pattern analysis module.

An abnormal pattern analysis method according to embodiments may categorize an abnormal pattern analysis framework to a plurality of analysis groups and include at least one analysis module in the plurality of analysis groups.

An abnormal pattern analysis method according to embodiments may visually provide an analysis result for analysis data to a user to cause the user to easily recognize an abnormal pattern detection status.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An abnormal pattern analysis method, the method comprising:
    determining, by a processor, a service application associated with analysis data;
    selecting, by the processor, at least one abnormal pattern analysis module among a plurality of different types of modules based on the determined service application, wherein the plurality of different types of abnormal pattern analysis modules are categorized in a plurality of groups in an abnormal pattern analysis framework, and the selecting, by the processor, at least one abnormal pattern analysis module including determining out of the plurality of groups, a selected categorized group; and
    performing, by the processor, an analysis for the analysis data through the selected at least one abnormal pattern analysis module to detect an abnormal pattern in the analysis data,
    wherein selecting the at least one abnormal pattern analysis module includes selecting a main abnormal pattern analysis module and a plurality of sub-abnormal pattern analysis modules based on the selected categorized group related to the determined service application, the plurality of sub-abnormal pattern analysis modules configured to detect a probability of an abnormal pattern in the analysis data when the main abnormal pattern analysis module does not detect an abnormal pattern,
    the plurality of categorized groups of the abnormal pattern analysis framework includes an abnormal pattern analysis group, a relationship analysis group, and an effectiveness analysis group, and
    the at least one abnormal pattern analysis module is selected according to the abnormal pattern analysis framework, from among the plurality of categorized groups, in which the abnormal pattern analysis group includes two or more main abnormal pattern analysis modules that analyze disparateness within the analysis data, the relationship analysis group includes two or more main abnormal pattern analysis modules that analyze a relationship between entities represented in the analysis data, and the effectiveness analysis group includes two or more main abnormal pattern analysis modules that analyze an effectiveness of an object associated with the analysis data, and
    performing the analysis for the analysis data includes:
        performing a determination, by the main abnormal pattern analysis module, to determine if an abnormality exists in the analysis data, when the abnormal pattern is detected in an analysis result,
        such performing the determination, by the main abnormal pattern analysis module, not detecting an abnormality;
        the plurality of sub-abnormal pattern analysis modules including a first sub-abnormal pattern analysis module and a second sub-abnormal pattern analysis module;
        based on such not detecting, by the main abnormal pattern analysis module, the plurality of sub-abnormal pattern analysis modules determining a possibility of an abnormality in the analysis data including:
            the first sub-abnormal pattern analysis module performing a first determination of whether an abnormal pattern is detected to yield a first result, the first result included in aggregated results;
            the second sub-abnormal pattern analysis module performing a second determination of whether an abnormal pattern is detected to yield a second result, the second result included in the aggregated results;
        the processor performing an assessment to determine an existence possibility to the abnormality including:
            determining a value based on at least the first result and the second result;
            comparing the value against the aggregated results to yield, by the processor, a numerical result;
            determining an existence possibility based on the numerical result;
            the determining the value based on at least the first result and the second result is constituted by a number of positive determinations in the first result and the second result,
            the numerical result is based on the number of positive determinations, reflecting an abnormality, compared to the aggregated results; and
            the aggregated results is a total number of determinations performed by the plurality of sub-abnormal pattern analysis modules.

2. The method of claim 1, wherein determining the service application includes determining an abnormal pattern detection scenario based on an analysis data field that is required in the service application.

3. The method of claim 1, wherein selecting the at least one abnormal pattern analysis module includes receiving a user's selection of the at least one abnormal pattern analysis module.

4. The method of claim 1, wherein the abnormal pattern analysis group includes a self-pattern change module configured to analyze the analysis data based on a time series based disparateness.

5. The method of claim 1, wherein the abnormal pattern analysis group includes an extreme case module configured to analyze the analysis data based on a deviation based disparateness away from a mean value.

6. The method of claim 1, wherein the abnormal pattern analysis group includes a trend comparison module configured to analyze the analysis data based on a trend based disparateness.

7. The method of claim 1, wherein the relationship analysis group includes a suspicious relationship module configured to analyze the analysis data based on a relationship between objects within a network.

8. The method of claim 1, wherein the effectiveness analysis group includes a service duplication module configured to analyze the analysis data based on occurrence of duplication among specific groups.

9. The method of claim 1, wherein the effectiveness analysis group includes a non-existence module configured to analyze the analysis data based on an effectiveness for non-actual data.

10. The method of claim 1, wherein the effectiveness analysis group includes an overflow module configured to analyze the analysis data based information related to a distance, a time, or a product characteristic of a service.

11. The method of claim 1, wherein the effectiveness analysis group includes an entity eligibility module configured to analyze the analysis data based on information related to an eligibility condition of a service provider or receiver.

12. The method of claim 1, further comprising:
displaying a detection result for the abnormal pattern based on a characteristic of the abnormal pattern analysis module.

13. The method of claim 1, the plurality of sub-abnormal pattern analysis modules further including a third sub-abnormal pattern analysis module;
the third sub-abnormal pattern analysis module performing a third determination of whether an abnormal pattern is detected to yield a third result included in the aggregated results; and the determining the value is also based on the third result.

14. The method of claim 13, the plurality of sub-abnormal pattern analysis modules further including a fourth sub-abnormal pattern analysis module;
the fourth sub-abnormal pattern analysis module performing a fourth determination of whether an abnormal pattern is detected to yield a fourth result included in the aggregated results; and the determining the value is also based on the fourth result.

15. An abnormal pattern analysis apparatus, the apparatus comprising:
a processor;
a memory including at least one storage space; and
a non-transitory computer-readable medium that includes commands causing the processor to perform a following method when the abnormal pattern analysis is executed, the method comprising:
determining a service application associated with analysis data;
selecting at least one abnormal pattern analysis module among a plurality of different types of modules based on the determined service application, wherein the plurality of different types of abnormal pattern analysis modules are categorized in a plurality of groups in an abnormal pattern analysis framework; and
performing an analysis for the analysis data through the selected at least one abnormal pattern analysis module to detect an abnormal pattern,
wherein selecting the at least one abnormal pattern analysis module includes selecting a main abnormal pattern analysis module and a plurality of sub-abnormal pattern analysis modules based on a selected categorized group related to the determined service application, the sub-abnormal pattern analysis module configured to detect a probability of an abnormal pattern in the analysis data when the main abnormal pattern analysis module does not detect an abnormal pattern,
wherein the plurality of categorized groups of the abnormal pattern analysis framework includes an abnormal pattern analysis group, a relationship analysis group, and an effectiveness analysis group, and
wherein the abnormal pattern analysis group includes at least one main abnormal pattern analysis module that analyzes disparateness within the analysis data, the relationship analysis group includes at least one main abnormal pattern analysis module that analyzes a relationship between entities represented in the analysis data, and the effectiveness analysis group includes at least one main abnormal pattern analysis module that analyzes an effectiveness of an object associated with the analysis data; and
performing the analysis for the analysis data includes:
performing a determination, by the main abnormal pattern analysis module, to determine if an abnormality exists in the analysis data, when the abnormal pattern is detected in an analysis result,
such performing the determination, by the main abnormal pattern analysis module, not detecting an abnormality;
the plurality of sub-abnormal pattern analysis modules including a first sub-abnormal pattern analysis module and a second sub-abnormal pattern analysis module;
based on such not detecting, by the main abnormal pattern analysis module, the plurality of sub-abnormal pattern analysis modules determining a possibility of an abnormality in the analysis data including:
the first sub-abnormal pattern analysis module performing a first determination of whether an abnormal pattern is detected to yield a first result, the first result included in aggregated results;
the second sub-abnormal pattern analysis module performing a second determination of whether an abnormal pattern is detected to yield a second result, the second result included in the aggregated results;
the processor performing an assessment to determine an existence possibility to the abnormality including:
determining a value based on at least the first result and the second result;
comparing the value against the aggregated results to yield, by the processor, a numerical result;
determining an existence possibility based on the numerical result;
the determining the value based on at least the first result and the second result is constituted by a number of positive determinations in the first result and the second result,
the numerical result is based on the number of positive determinations, reflecting an abnormality, compared to the aggregated results; and
the aggregated results is a total number of determinations performed by the plurality of sub-abnormal pattern analysis modules.

16. The apparatus of claim 15, wherein determining the service application determines an abnormal pattern detection scenario based on an analysis data field that is required in the service application.

17. A non-transitory computer readable storage medium recording a computer program for an abnormal pattern analysis method comprising:
a function to determine a service application associated with analysis data;
a function to select at least one abnormal pattern analysis module among a plurality of different types of modules based on the determined service application, wherein the plurality of different types of abnormal pattern analysis modules are categorized in a plurality of groups in an abnormal pattern analysis framework; and
a function to perform an analysis for the analysis data through the selected at least one abnormal pattern analysis module to detect an abnormal pattern,
wherein the function to select the at least one abnormal pattern analysis module includes a function to select a main abnormal pattern analysis module and a plurality of sub-abnormal pattern analysis modules based on a selected categorized group related to the determined service application, the sub-abnormal pattern analysis modules configured to detect a probability of an abnormal pattern in the analysis data when the main abnormal pattern analysis module does not detect an abnormal pattern,
wherein the plurality of categorized groups of the abnormal pattern analysis framework includes an abnormal pattern analysis group, a relationship analysis group, and an effectiveness analysis group, and wherein the abnormal pattern analysis group includes at least one main abnormal pattern analysis module that analyzes disparateness within the analysis data, the relationship analysis group includes at least one main abnormal pattern analysis module that analyzes a relationship between entities represented in the analysis data, and the effectiveness analysis group includes at least one main abnormal pattern analysis module that analyzes an effectiveness of an object associated with the analysis data and the function to perform the analysis for the analysis data includes:

performing a determination, by the main abnormal pattern analysis module, to determine if an abnormality exists in the analysis data, when the abnormal pattern is detected in an analysis result, such performing the determination, by the main abnormal pattern analysis module, not detecting an abnormality;

the plurality of sub-abnormal pattern analysis modules including a first sub-abnormal pattern analysis module and a second sub-abnormal pattern analysis module;

based on such not detecting, by the main abnormal pattern analysis module, the plurality of sub-abnormal pattern analysis modules determining a possibility of an abnormality in the analysis data including:

the first sub-abnormal pattern analysis module performing a first determination of whether an abnormal pattern is detected to yield a first result, the first result included in aggregated results;

the second sub-abnormal pattern analysis module performing a second determination of whether an abnormal pattern is detected to yield a second result, the second result included in the aggregated results;

the function to perform the analysis for the analysis data further including performing an assessment to determine an existence possibility to the abnormality including:

determining a value based on at least the first result and the second result;

comparing the value against the aggregated results to yield a numerical result;

determining an existence possibility based on the numerical result;

the determining the value based on at least the first result and the second result is constituted by a number of positive determinations in the first result and the second result, the numerical result is based on the number of positive determinations, reflecting an abnormality, compared to the aggregated results; and the aggregated results is a total number of determinations performed by the plurality of sub-abnormal pattern analysis modules.

* * * * *